P. LINK.
DOUGH MIXING AND KNEADING APPARATUS.
APPLICATION FILED DEC. 19, 1912.

1,105,148.

Patented July 28, 1914.
5 SHEETS—SHEET 1.

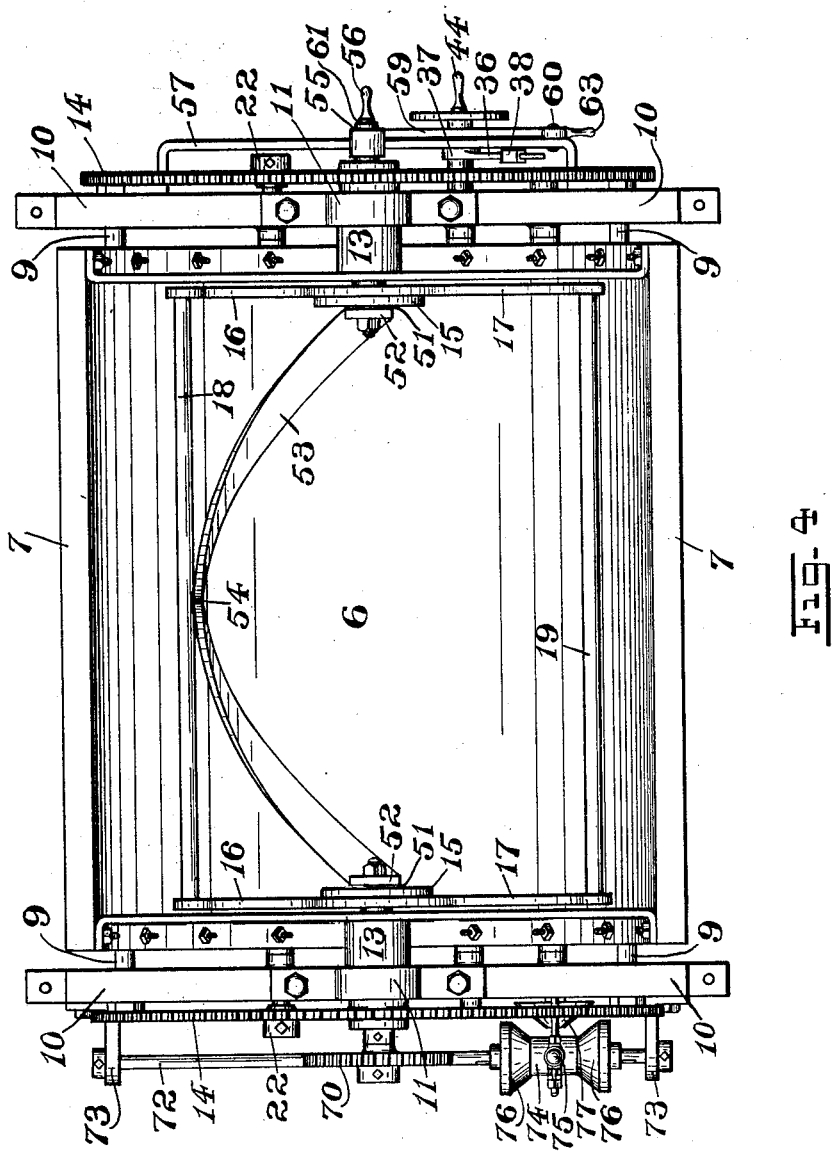

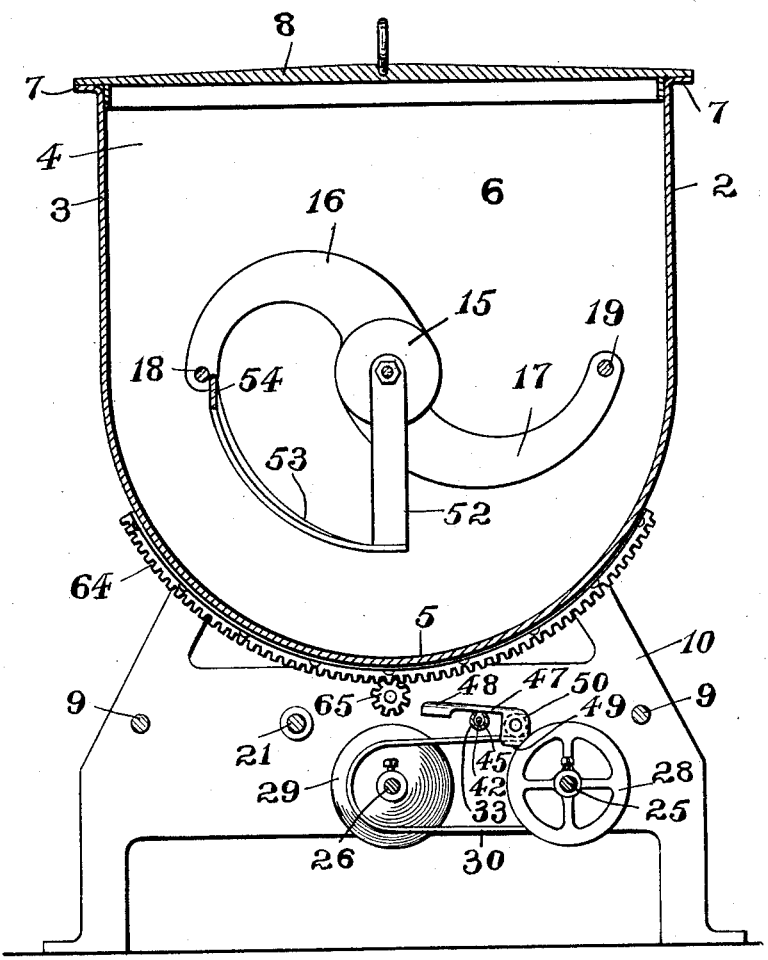

UNITED STATES PATENT OFFICE.

PHILIPP LINK, OF NEWARK, NEW JERSEY.

DOUGH MIXING AND KNEADING APPARATUS.

1,105,148.   Specification of Letters Patent.   Patented July 28, 1914.

Application filed December 19, 1912.   Serial No. 737,586.

*To all whom it may concern:*

Be it known that I, PHILIPP LINK, a citizen of the United States, residing at Newark, in the county of Essex and State of New Jersey, have invented certain new and useful Improvements in Dough Mixing and Kneading Apparatus; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in that class of apparatus employed for mixing and kneading dough; and, the present invention has reference, more particularly, to a novel apparatus of the general character hereinafter more fully stated for properly mixing and kneading dough, as well as throwing the same, so that the dough becomes thoroughly aerated.

The invention, therefore, has for its principal object to provide a novel and simply constructed apparatus for the purposes of properly mixing, kneading, and throwing dough, the general arrangement of the mechanism of the apparatus, both within the mixing compartment, as well as that located without the said compartment being such, so that the dough, as it is being mixed or rolled or twisted into a plastic mass, is caught upon a holder in a ball-shaped mass, and is removed from the holder and thrown within the compartment in such a manner to be again caught upon the holder, the operations of throwing and catching taking place alternately for such length of time until the dough has become perfectly aerated and kneaded, and the bread, when baked, has a perfectly white appearance.

Other objects of this invention not at this time more particularly enumerated will be clearly understood from the following detailed description of the present invention.

With the various objects of the present invention in view, the invention consists, primarily, in the novel dough-mixing and kneading apparatus hereinafter set forth; and, the invention consists, furthermore, in the novel arrangements and combinations of the various devices and parts, as well as in the details of the construction of the same, all of which will be more fully described in the following specification, and then finally embodied in the clauses of the claim which are appended to and which form an essential part of this specification.

The invention is clearly illustrated in the accompanying drawings, in which:—

Figure 1:
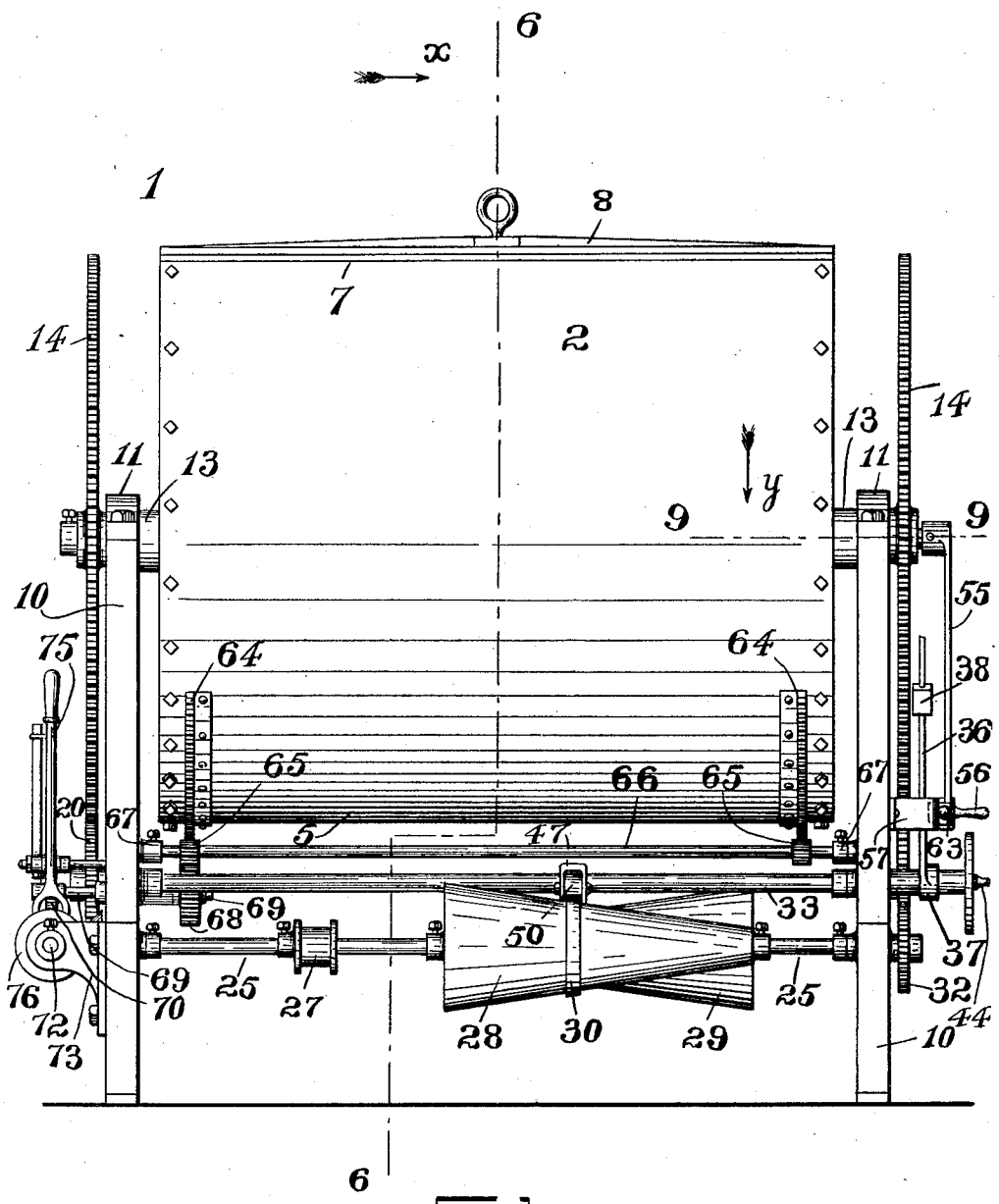
Figure 2:
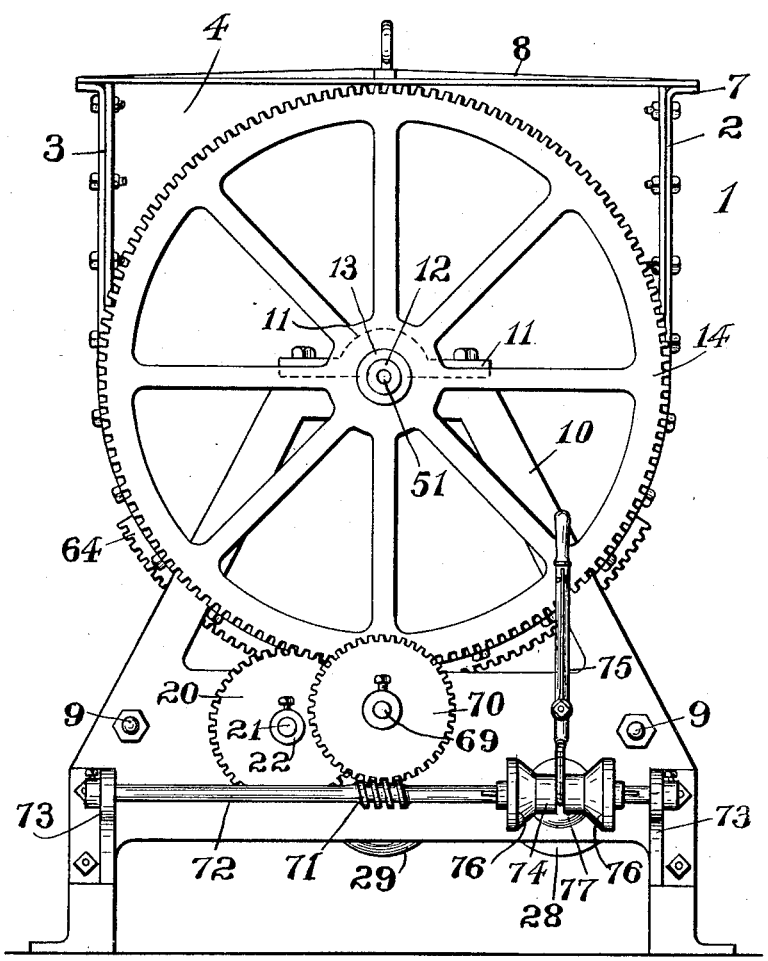
Figure 3:
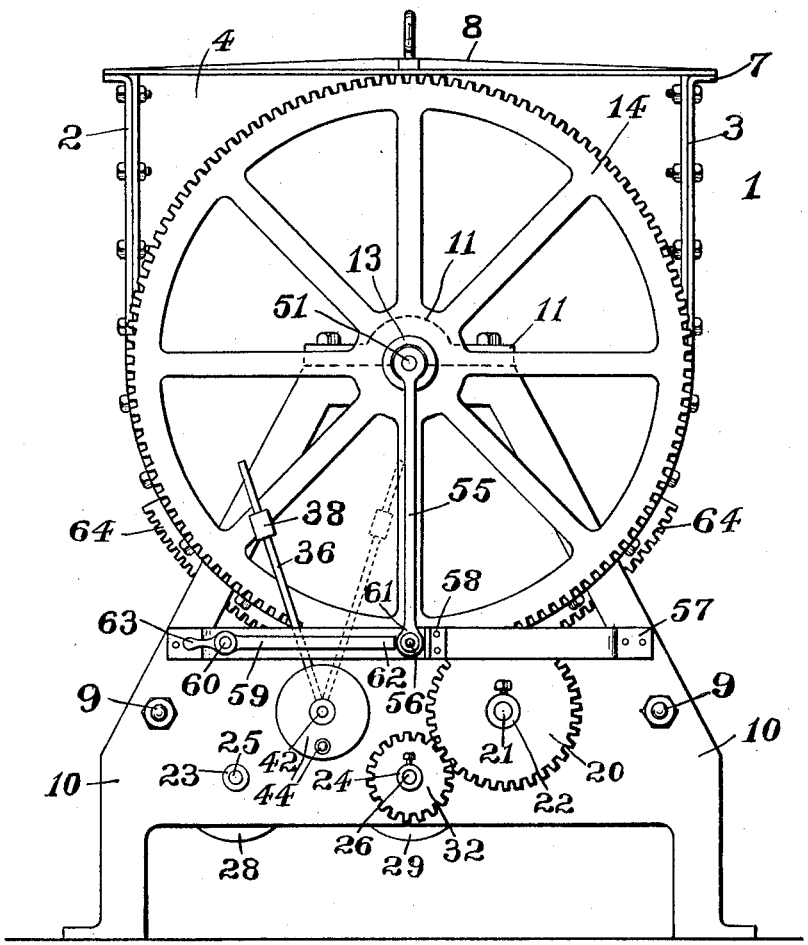

Figure 1 is a front elevation of a dough-mixing and kneading apparatus showing one embodiment of the principles of the present invention; Figs. 2 and 3 are the two end views of the same; and Fig. 4 is a top view of the apparatus, with the top-cover for closing the mixing or kneading compartment omitted from said view. Fig. 5 is a transverse section of the apparatus, said section being taken on line 6—6 in Fig. 1, looking in the direction of the arrow *x*.

Similar characters of reference are employed in all of the above described views, to indicate corresponding parts.

Referring now to the said drawings, the reference-character 1 indicates the complete apparatus for mixing and kneading dough, and showing one embodiment of the principles of the present invention, the said apparatus comprising a main shell or casing, preferably of the cross-sectional representation shown more particularly in Fig. 6 of the drawings, the said shell or casing being formed of the longitudinally extending front side 2, the rear side 3, the ends 4, and the semi-cylindrically shaped bottom 5, all arranged to provide a suitable mixing or kneading compartment or chamber 6. The upper marginal edge-portion of the said shell or casing is preferably flanged, as at 7, and resting upon this flange 7 is a removable cover or lid, as 8.

The reference-character 10 indicates a pair of suitably shaped frame-like elements or standards, the standards being suitably connected by means of tie-rods 9, and each standard being provided at its upper end with a suitably constructed bearing, as 11. Rotatably mounted in the said bearings 11 are short tubular shaft-like members or spindles 12, each spindle 12 being rotatably arranged in a tubular hub 13, with which each end 4 of the main shell or casing of the apparatus is provided, the one end-portion of each spindle 12 extending part way into the compartment or chamber 6, and the other end-portion of each spindle extending outside of the hub 13 in which it is arranged, and suitably mounted upon such projecting end-portion of each spindle 12 is a large driving gear 14. Within the said chamber or compartment 6 is a mixer or kneader, made in the form of a frame-like element comprising a pair of side-hubs 15, for arranging and permanently securing said frame-like element upon the inwardly projecting end-portions of the two spindles 12, so that it will rotate with the said spindles. Extending in opposite directions from each side-hub 15 are a pair of carrier-arms 16 and 17, the said arms 17 being preferably made shorter than the arms 16. Suitably connected with the free end-portions of each pair of arms 16 is a longitudinally extending rod or bar 18, and likewise suitably connected with the free end-portions of each pair of arms 17 is another longitudinally extending rod or bar 19.

Rotary motion of the large driving gears 14, and hence of the spindles 12 and the said mixer or kneader within the compartment or chamber 6, is produced by a pair of pinions 20, each in mesh with a gear 14, and suitably secured upon a shaft 21, which is rotatably mounted in bearing-portions 22 with which the said frame-like element or standards 10 are provided. Rotatably mounted in other bearing-portions 23 and 24 of said frame-like element or standards 10 are a pair of other shafts 25 and 26, one of which, as 25, is the main driving shaft and has suitably secured thereon a driving pulley, as 27, over which is adapted to pass a driving belt for operating said shaft 25. Speed-pulleys, preferably in the form of cone-pulleys 28 and 29, are suitably mounted upon the respective shafts 25 and 26, and over which passes a laterally slidable drive-belt 30, for gradually increasing or diminishing the speed, as may be necessary during the dough-mixing and kneading process, and by means of which the rotary motion of the shaft 25 is conveyed to the shaft 26. The rotary motion of the shaft 26 is conveyed by means of a gear-wheel 32, suitably secured upon said shaft 26, to one of the pinions 20 upon the shaft 21, and by means of the pinions 20 to the large gear-wheels 14, as will be clearly understood from an inspection of the several figures of the drawings.

The means for laterally moving the drive-belt 30 in either direction upon the cone-pulleys 28 and 29 is shown more particularly in Figs. 5, 6, 7 and 8 of the drawings, and consists, essentially, of a shaft or rod 33 which is capable of being rocked or oscillated to a limited degree in bearing-portions 34 in the standards or frame-like elements 10, the said shaft or rod 33 having suitably affixed thereto by means of a set-screw 35, or in any other suitable manner, the hub-portion 37 of an operating lever, as 36, the upper portion of which is preferably weighted, as at 38, substantially as shown in Fig. 5. A belt-shifter and tensioning device, as 47, is slidably mounted with relation to said shaft or rod. Upon its one end, the said belt shifter and tensioning device 47 is weighted, as at 48, and upon its other end it is made with a suitably formed belt-guide, as 49, through which the drive-belt 30 passes and is suitably tensioned by a roller, as 50 which is mounted in said guide, and normally bears in rolling engagement upon the upper surface of said belt 30. To remove the said roller 50 from its bearing engagement or contact with the belt 30, the previously-mentioned operating lever 36, is thrown from its normal initial position shown in Fig. 3 of the drawings to the dotted position indicated in the same figure, whereby the rod 33 is slightly oscillated, and the rod 42, within said rod 33 is correspondingly moved, so that the belt-shifter receives a different angular relation to the plane of the face of the belt 30, from that shown in the several figures of the drawings, thus carrying the roller 50 away from its contact with the belt-surface, and thereby permitting the belt 30 to run slack, as will be evident.

As has been stated, the two spindles 12 are hollow or tubular, and oscillatorily arranged in the said tubular spindles 12 are the journals 51 of a dough-holder, comprising a pair of downwardly extending arms or members 52, each of which is connected with a journal 51, and with which are connected and extend a pair of angularly disposed and suitably curved members, as 53, which meet in a point, as at 54, which serves at proper times to hold the mixed or kneaded dough. The normal position of the said dough-holder is that shown more particularly in Fig. 5 of the drawings, and the general arrangement of the curved members 53 is such, that during the revolutions of the mixer or kneader, the longitudinally extending rod or bar 18 is intermittently brought into sliding engagement with the upper surfaces of the curved members 53, while the other longitudinally extending rod or bar 19, during its rotary movements does not contact with the said curved members 53. The said dough-holder, if desired, may also be actuated by hand, by means of an arm or lever 55, mounted outside of the apparatus upon one of the journals 51, the said arm or lever 55 being provided at its lower end with a crank or handle 56.

In Fig. 3 of the drawings, I have shown one means for holding the dough-holder in its normal initial position, against turning during the mixing and kneading operations, and said means consists essentially of a plate-like member or bar 57 suitably secured upon one of the frame-like elements or standards 10, a stop 58 being mounted upon said plate or bar 57, and also a rod or bar 59 is pivoted to said plate or bar 57, as at 60. The portion 61 of the arm or lever 55 is held in its fixed position between the stop 58 and the end-portion 62 of the pivoted bar or rod 59, substantially as indicated in said Fig. 3. The said bar or rod 59 is also provided with a handle-portion 63, by means of which the said rod or bar 59, and its end-portion 62 may be sufficiently raised out of engagement with the arm or lever 55 to permit the oscillation of the lever and the dough-holder connected therewith, as will be clearly evident.

In order to remove the dough from within the compartment or chamber 6, after it has been properly mixed and kneaded, the main shell or casing may be suitably tilted upon its journals mounted in the frame-like elements or standards 10, the top cover or lid having been previously removed. To produce this tilting movement of the said main shell or casing, the latter is provided upon the outer surface of its curved bottom with a pair of correspondingly formed racks 64, and in engagement with the said racks are a pair of pinions 65, suitably mounted upon a shaft 66. This shaft 66 is rotatably arranged in bearing-portions 67 in the standards 10, and one of its pinions 65, meshes with a gear 68 upon a short spindle 69, and which has suitably mounted thereon a worm-wheel 70. This worm-wheel meshes with a worm 71 upon a shaft 72 which is rotatably arranged in a pair of bearings 73 suitably secured to one of said standards 10. Slidably mounted upon said shaft 72 is a suitably constructed friction-clutch 74 adapted to be moved in either direction upon said shaft 72, by means of a spring-controlled and pivotally secured operating lever 75, whereby either of the cone-surfaces 76 of the said clutch can be brought into operative engagement with a cone 77 which is suitably secured to the main driving shaft 25, as will be clearly understood from an inspection of Fig. 2 of the drawings.

The operation of the herein-described dough-mixing and kneading apparatus will be clearly understood from the foregoing description of the same, and from an inspection of the several figures of the accompanying drawings.

Of course, I am fully aware that various changes may be made in the general arrangements and combinations of the several devices and parts, as well as in the details of the construction of the same, without departing from the scope of the present invention as described in the foregoing specification and as defined in the clauses of the claim which is appended hereto. Hence, I do not limit my present invention to the exact arrangements and combinations of the said devices and parts as described in the said specification, nor do I confine myself to the exact details of the construction of the said parts as illustrated in the accompanying drawings.

I claim:—

1. In a dough-mixing apparatus, a main shell or casing, a rotary mixing and kneading element within said casing, and an independently operating dough-holder within said casing adapted to be brought intermittently into scraping relation with a portion of said mixing and kneading element.

2. In a dough-mixing apparatus, a main shell or casing, a rotary mixing and kneading element within said casing, comprising side-arms extending in opposite directions from the points of pivotal support of said mixing and kneading element, longitudinally extending bars between and connected with said side-arms, and an independently operating dough-holder within said casing adapted to be brought intermittently into scraping relation with one of said longitudinally extending bars of said mixing and kneading element.

3. In a dough-mixing apparatus, a main shell or casing, a rotary mixing and kneading element within said casing, comprising side-arms extending in opposite directions from the points of pivotal support of said mixing and kneading element, longitudinally extending bars between and connected with said side-arms, and an independently operating dough-holder within said casing consisting of a pair of curved members meeting in a point adapted to be brought intermittently into scraping relation with one of said longitudinally extending bars of said mixing and kneading element.

4. In a dough mixing apparatus, a main shell or casing, a rotary frame-like mixing and kneading element within said casing, and an oscillatory dough-holder arranged within said frame-like mixing and kneading element having a movement independent of the movement of said mixing and kneading element, said dough-holder consisting of curved members meeting in a point adapted to be brought intermittently into scraping relation with a portion of said mixing and kneading element.

5. In a dough-mixing apparatus, the combination with a pair of standards having bearing-portions, a short spindle mounted in each bearing-portion, a main shell or casing mounted upon said spindles, each spindle having its inner end-portion extending into the interior of said shell or casing, a rotary mixing and kneading element within said casing and mounted upon said spindles, means for rotating said spindles and said mixing and kneading element, an oscillatory dough-holder in said shell or casing, and means connected with said dough-holder for oscillating the same.

6. In a dough-mixing apparatus, the combination with a pair of standards having bearing-portions, a short spindle mounted upon said spindles, each spindle having its inner end-portion extending into the interior of said shell or casing, a rotary mixing and kneading element within said casing and mounted upon said spindles, means for rotating said spindles and said mixing and kneading element, an oscillatory dough-holder in said shell or casing, said dough-holder comprising a pair of curved members meeting in a point, said members being adapted to be brought into scraping relation with said rotary mixing and kneading element, and means connected with said dough-holder for oscillating the same.

7. In a dough-mixing apparatus, the combination with a pair of standards having bearing-portions, a short tubular spindle mounted in each bearing-portion, a main shell or casing mounted upon said spindles, each spindle having its inner end-portion extending into the interior of said shell or casing, a rotary mixing and kneading element within said casing and mounted upon said spindles, means for rotating said spindles and said mixing and kneading element, a journal arranged within each tubular spindle, said journals having their inner end-portions extending into said main shell or casing, an oscillatory dough-holder in said shell or casing and suspended from said journals, and means connected with one of said journals for oscillating the same and the said dough-holder.

8. In a dough-mixing apparatus, the combination with a pair of standards having bearing-portions, a short tubular spindle mounted in each bearing-portion, a main shell or casing mounted upon said spindles, each spindle having its inner end-portion extending into the interior of said shell or casing, a rotary mixing and kneading element within said casing and mounted upon said spindles, means for rotating said spindles and said mixing and kneading element, a journal arranged within each tubular spindle, said journals having their inner end-portions extending into said main shell or casing, an oscillatory dough-holder in said shell or casing and suspended from said journals, said dough-holder comprising a pair of downwardly extending arms connected with said journals, and a pair of curved members extending from said arms and meeting in a point, said members being adapted to be brought into scraping relation with said rotary mixing and kneading element, and means connected with one of said journals for oscillating the same and said dough-holder.

9. In a dough-mixing apparatus, the combination with a pair of standards having bearing-portions, a short tubular spindle mounted in each bearing-portion, a shell or casing mounted upon said spindles, each spindle having its inner end-portion extending into the interior of said shell or casing, a rotary mixing and kneading element within said casing and mounted upon said spindles, means for rotating said spindles and said mixing and kneading element, a journal arranged within each tubular spindle, said journals having their inner end-portions extending into said main shell or casing, an oscillatory dough-holder in said shell or casing and suspended from said journals, a lever connected with one of said journals for oscillating the same and said dough-holder, and means connected with one of said standards for locking said lever against movement.

10. In a dough-mixing apparatus, the combination with a pair of standards having bearing-portions, a short tubular spindle mounted in each bearing-portion, a main shell or casing mounted upon said spindles, each spindle having its inner end-portion extending into the interior of said shell or casing, a rotary mixing and kneading element within said casing and mounted upon said spindles, means for rotating said spindles and said mixing and kneading element, a journal arranged within each tubular spindle, said journals having their inner end-portions extending into said main shell or casing, an oscillatory dough-holder in said shell or casing and suspended from said journals, said dough-holder comprising a pair of downwardly extending arms connected with said journals, and a pair of curved members extending from said arms and meeting in a point, said members being adapted to be brought into scraping relation with said rotary mixing and kneading element, a lever connected with one of said journals for oscillating the same and said dough-holder, and means connected with one of said standards for locking said lever against movement.

11. In a dough-mixing apparatus, the combination with a pair of standards having bearing-portions, a short tubular spindle mounted in each bearing-portion, a main shell or casing mounted upon said spindles, each spindle having its inner end-portion extending into the interior of said shell or casing, a rotary mixing and kneading element within said shell or casing, comprising a pair of hubs arranged upon and fixed to said short spindles, a pair of arms extending in opposite directions from each hub, one pair of said arms being shorter than the other pair of arms, a longitudinally extending bar between and connected with the free end-portions of each pair of short arms, and a longitudinally extending bar between and connected with the free end-portions of said pair of longer arms, and means for revolving said short spindles and said mixing and kneading element, a journal arranged within each tubular spindle, said journals having their inner end-portions extending into said main shell or casing, an oscillatory dough-holder in said shell or casing and suspended from said journals, and means connected with one of said journals for oscillating the same and bringing a portion thereof in scraping relation with the bar connected with the short arms of the said dough-mixing and kneading element.

12. In a dough-mixing apparatus, the combination with a pair of standards having bearing-portions, a short tubular spindle mounted in each bearing-portion, a main shell or casing mounted upon said spindles, each spindle having its inner end-portion extending into the interior of said shell or casing, a rotary mixing and kneading element within said shell or casing, comprising a pair of hubs arranged upon and fixed to said short spindles, a pair of arms extending in opposite directions from each hub, one pair of said arms being shorter than the other pair of arms, a longitudinally extending bar between and connected with the free end-portions of each pair of short arms, and a longitudinally extending bar between and connected with the free end-portions of said pair of longer arms, and means for revolving said short spindles and said mixing and kneading element, a journal arranged within each tubular spindle, said journals having their inner end-portions extending into said main shell or casing, an oscillatory dough-holder in said shell or casing and suspended from said journals, said dough-holder comprising a pair of downwardly extending arms connected with said journals, and a pair of curved members extending from said arms and meeting in a point, said curved members being adapted to be brought into scraping relation with the bar connected with the short arms of the dough-mixing and kneading element, and means connected with one of said journals for oscillating the same and said dough-holder.

13. In a dough-mixing apparatus, the combination with a pair of standards having bearing-portions, a short tubular spindle mounted in each bearing-portion, a main shell or casing mounted upon said spindles, each spindle having its inner end-portion extending into the interior of said shell or casing, a rotary mixing and kneading element within said shell or casing, comprising a pair of hubs arranged upon and fixed to said short spindles, a pair of arms extending in opposite directions from each hub, one pair of said arms being shorter than the other pair of arms, a longitudinally extending bar between and connected with the free end-portions of each pair of short arms, and a longitudinally extending bar between and connected with the free end-portions of said pair of longer arms, and means for revolving said short spindles and said mixing and kneading element, a journal arranged within each tubular spindle, said journals having their inner end-portions extending into said main shell or casing, an oscillatory dough-holder in said shell or casing and suspended from said journals, said dough-holder comprising a pair of downwardly extending arms connected with said journals, and a pair of curved members extending from said arms and meeting in a point, said curved members being adapted to be brought into scraping relation with the bar connected with the short arms of the dough-mixing and kneading element, a lever connected with one of said journals for oscillating the same and said dough-holder, and means connected with one of said standards for locking said lever against movement.

In testimony, that I claim the invention set forth above I have hereunto set my hand this 14th day of December, 1912.

PHILIPP LINK.

Witnesses:
 FREDK. C. FRAENTZEL,
 FREDK. H. W. FRAENTZEL.

Copies of this patent may be obtained for five cents each, by addressing the "Commissioner of Patents, Washington, D. C."